(12) United States Patent
Schulz et al.

(10) Patent No.: US 8,654,967 B2
(45) Date of Patent: Feb. 18, 2014

(54) SYSTEM FOR CONDITIONING ECHO RESPONSE OF LOOP START TRUNK LINE

(75) Inventors: Dieter Schulz, Dunrobin (CA); Yonghua Fang, Ottawa (CA); Renee Johnston, Dunrobin (CA); Mirjana Popovic, Ottawa (CA)

(73) Assignee: Mitel Networks Corporation, Ottawa (CA)

( * ) Notice: Subject to any disclaimer, the term of this patent is extended or adjusted under 35 U.S.C. 154(b) by 1668 days.

(21) Appl. No.: 11/608,470

(22) Filed: Dec. 8, 2006

(65) Prior Publication Data

US 2007/0133786 A1    Jun. 14, 2007

(30) Foreign Application Priority Data

Dec. 9, 2005  (EP) .................................... 05257586

(51) Int. Cl.
 *H04M 9/08* (2006.01)
(52) U.S. Cl.
 USPC .............................. 379/406.08; 379/406.01
(58) Field of Classification Search
 USPC ............. 379/3, 406.01–406.16, 390.03–395; 370/286, 289; 381/71.1–71.14
 See application file for complete search history.

(56) References Cited

U.S. PATENT DOCUMENTS

| | | | | |
|---|---|---|---|---|
| 4,539,675 A | * | 9/1985 | Fisher | 370/291 |
| 4,600,815 A | * | 7/1986 | Horna | 379/406.08 |
| 4,600,818 A | * | 7/1986 | Eto | 200/5 R |
| 4,757,527 A | * | 7/1988 | Beniston et al. | 379/406.09 |
| 4,965,822 A | * | 10/1990 | Williams | 379/406.08 |
| 5,084,865 A | * | 1/1992 | Koike | 370/289 |
| 5,663,955 A | * | 9/1997 | Iyengar | 370/291 |
| 5,664,011 A | * | 9/1997 | Crochiere et al. | 379/406.08 |
| 6,181,794 B1 | * | 1/2001 | Park et al. | 379/406.08 |
| 6,768,723 B1 | | 7/2004 | Popovic et al. | |
| 6,826,279 B1 | * | 11/2004 | Alavi et al. | 379/406.08 |
| 6,934,387 B1 | | 8/2005 | Kim | |
| 7,142,665 B2 | * | 11/2006 | Barron et al. | 379/406.08 |
| 7,532,717 B2 | * | 5/2009 | Nishimura | 379/406.01 |
| 2003/0118177 A1 | * | 6/2003 | Karakas et al. | 379/406.01 |
| 2004/0161101 A1 | * | 8/2004 | Yiu et al. | 379/406.01 |
| 2005/0025273 A1 | * | 2/2005 | Tschirk | 375/350 |
| 2009/0028312 A1 | * | 1/2009 | Karnalkar et al. | 379/201.01 |
| 2009/0028321 A1 | * | 1/2009 | Cheng | 379/406.08 |

FOREIGN PATENT DOCUMENTS

FR    2682252    4/1991

* cited by examiner

*Primary Examiner* — Fan Tsang
*Assistant Examiner* — Akelaw Teshale

(57) ABSTRACT

An echo canceling system has an adaptive filter connected to an echo source, for canceling echo from an echo path. A fixed echo conditioning filter is connected in series with the adaptive filter, intermediate the echo source and the adaptive filter. The fixed echo conditioning filter cancels the constant part of the echo path using a measured impulse response of the echo path.

8 Claims, 5 Drawing Sheets

US 8,654,967 B2

SYSTEM FOR CONDITIONING ECHO RESPONSE OF LOOP START TRUNK LINE

FIELD OF THE INVENTION

The present invention relates generally to communication systems, and more particularly to a system for canceling echo in an echo path including constant and varying echo portions.

RELATED APPLICATIONS

This application claims foreign priority under 35 U.S.C. 119(a) to European Patent Application No. 05257586.7, entitled, "System for Canceling Echo in an Echo Path Including Constant and Varying Portions", filed Dec. 9, 2005. European Patent Application 05257586.7 is hereby incorporated by reference in its entirety.

BACKGROUND OF THE INVENTION

The signal path between two telephones requires amplification using a four-wire circuit. The cost and cabling required discourage extending a four-wire circuit to a subscriber's premise (i.e. Private Branch Exchange (PBX)) from the local exchange or Central Office (CO). For this reason, the four-wire circuits are coupled to two-wire circuits, using a device called a hybrid. Thus, when a PBX is connected to the CO through a Loop-Start (LS) Trunk Line, for example, the hybrid couples the analog signal from the four-wire circuit (where incoming and outgoing signals are separate) to the two-wire circuit where the incoming and outgoing signals are combined.

Ideally, a hybrid passes an incoming signal from an incoming port to the two-wire circuit and does not pass any signal back to the outgoing port. Unfortunately, the hybrid does not perform ideally and thus, the hybrid is a leaky device. As signals pass from the four-wire to the two-wire portion of the network, the energy in the four-wire section is reflected back, creating an echo of the signal. The intensity of the echo depends on how well the impedance is matched between both sides of the hybrid. The impedance of the two-wire circuit can vary widely depending on factors including the line set-up in the CO equipment, the distance between CO and PBX, the electrical characteristics of the wire, etc. Provided that the total round-trip delay occurs within just a few milliseconds, the echo generates a sense that the call is 'live' by adding sidetone, thereby making a positive contribution to the quality of the call.

In cases where the total network delay exceeds 36 ms, however, the positive benefits disappear, and intrusive echo results. The actual amount of signal that is reflected back depends on how well the balance circuit of the hybrid matches the two-wire line. In the vast majority of cases, the match is poor, resulting in a considerable level of signal being reflected back.

It is known in the art to employ adaptive filtering to provide hybrid echo cancellation. Normalized Least Mean Square (NLMS) adaptive filtering is one method, popular in echo cancellation, to address reflections in Voice-Over-IP (VOIP) systems.

Clearly, a well-matched four-wire circuit gives little echo and makes the echo-canceling task easier. However, the selection of a best set of matching impedance settings for a specific Trunk Line is currently very subjective, mainly based on experience using trial and error. Such manual measurement consumes enormous human effort and time. Traditionally, a compromise setting is used that attempts to match a wide range of impedances, thereby sacrificing overall ERL (echo return loss) and resulting in less echo suppression. Often the echo level is at the same level as or a higher level than the incoming signal, making it difficult for the echo canceller to distinguish between echo and double talk.

In general, standard echo cancellers (adaptive filters) cancel both the constant and the varying echo path. Unfortunately, any impairment in the network can impact the echo performance of the adaptation and cause the echo canceller to diverge, even from the echo path that remains constant. U.S. Pat. No. 6,768,723 and U.S. patent application Ser. No. 10/722,472, assigned to the assignee of the present application, the entire contents of which are incorporated herein by reference, describe a method for capturing the constant echo path in a full-duplex handsfree (FDHF) algorithm and using the constant echo coefficients as default start-up parameters. U.S. Pat. No. 6,768,723 teaches capturing and re-using coefficients of the Line Echo Canceller (LEC) representing the first hybrid reflection in the analog phone, for the purpose of improving speakerphone stability in the FDHF algorithm, where the system contains both a line echo canceller and an acoustic echo canceller. However, for line echo the changing network echo path can be superimposed over the constant echo path in such a way that no start-up coefficients can be reused. A different technique for canceling the constant echo path is therefore desirable.

SUMMARY OF THE INVENTION

In one aspect of the present invention, there is provided an echo canceling system having an adaptive filter connected to an echo source, for canceling echo from an echo path. A fixed echo conditioning filter is connected in series with the adaptive filter, intermediate the echo source and the adaptive filter. The fixed echo conditioning filter cancels the constant part of the echo path using a measured impulse response of the echo path.

Advantageously, the constant part of the echo path is canceled in the fixed echo conditioning filter using the measured impulse response of the echo path. The varying part of the echo path is cancelled in the adaptive filter. Thus, the performance of the echo canceller is improved under poor impedance matching conditions, as compared to prior art echo cancellers.

In a particular aspect, the ratio between incoming signal and echo is improved by reducing the echo signal to improve the overall performance of the echo canceller.

In another aspect, a gain pad is provided for boosting an incoming signal after canceling the constant portion of the echo path in the fixed echo conditioning filter. Advantageously, boosting the signal improves the double talk decision method of the echo canceller.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
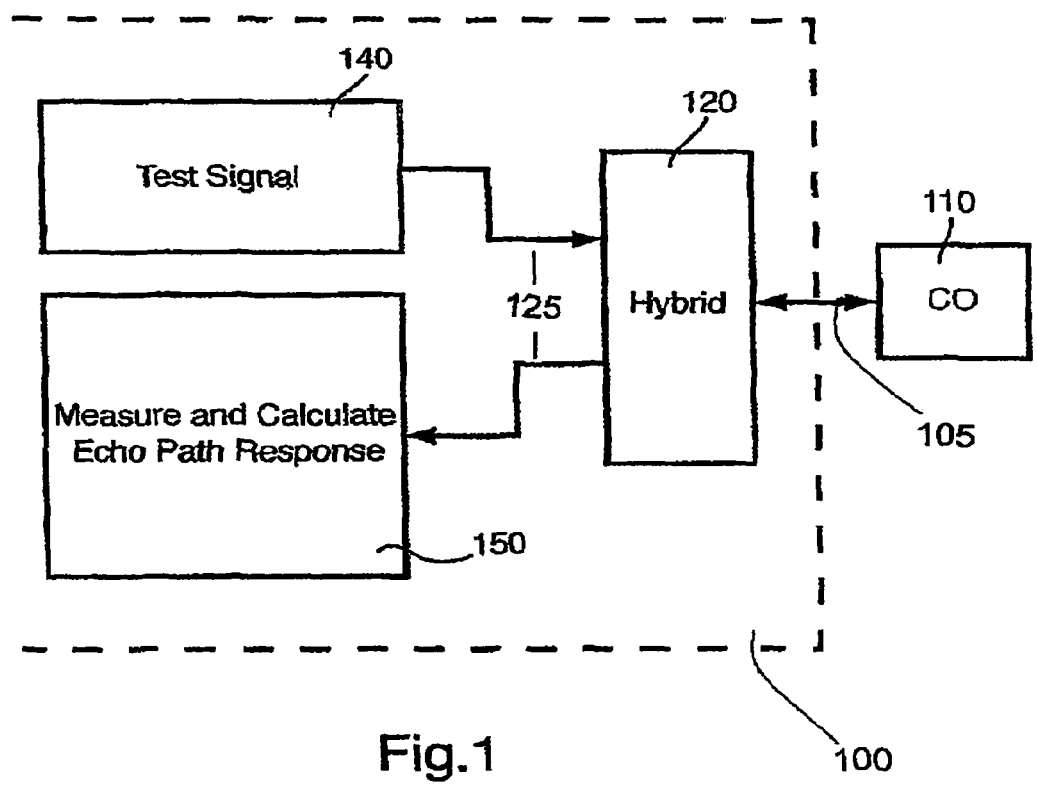
FIG. 1 is a schematic representation of a test configuration for implementing the method according to the present invention.

Turning first to FIG. 1, a PBX 100 is shown connected via a two-wire local line 105 to a Central Office (CO) 110. A hybrid 120 converts the signals between two-wire line 105 (i.e. the loop start (LS) trunk line) and the four-wire lines 125 within the PBX 100. However, as discussed above, impedance mismatch between the two-wire line 105 and four-wire line 125 give rise to trans-hybrid echo. A Digital Signal Processor (DSP) 140 is connected to the hybrid for playing an audio file to the outgoing line 125 of the LS trunk interface and a controller 150 is provided for measuring and calculating echo path response (i.e. the impulse response).

Figure 2:
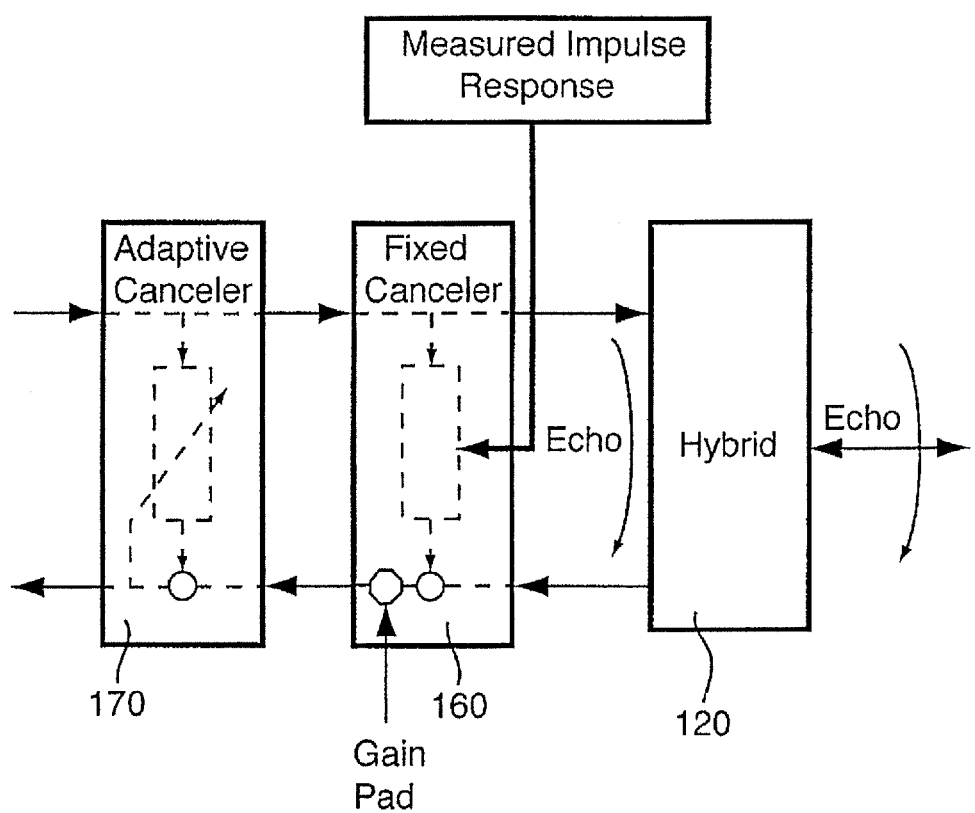
FIG. 2 is a control block diagram of an adaptive filter echo canceling system connected to an echo source in accordance with an embodiment of the present invention.

Referring to FIG. 2, there is shown a control block diagram of an adaptive filter echo canceling system connected to the hybrid 120 in accordance with an embodiment of the present invention. As previously described, an echo generally consists of a constant, non-changing echo path and a changing echo path. A fixed canceller 160 (i.e. fixed coefficient Finite Impulse Response (FIR) filter) is used for canceling the constant part of the echo path while the varying echo path is cancelled with an adaptive canceller 170 (i.e. a FIR filter with adaptive coefficients). More particularly, the coefficients used for the taps of the fixed echo canceller are measured from the impulse response of the filter under constant echo path conditions, as described in greater detail below with reference to FIG. 3, using the test configuration of FIG. 1. The fixed echo canceller 160 and the adaptive echo canceller 170 are connected in series to provide cancellation of the constant and varying portions, respectively, of the echo path. In the preferred embodiment, the fixed echo canceller 160 also includes a gain pad for boosting the incoming signal after the constant portion of the echo signal has been cancelled.

Figure 3:
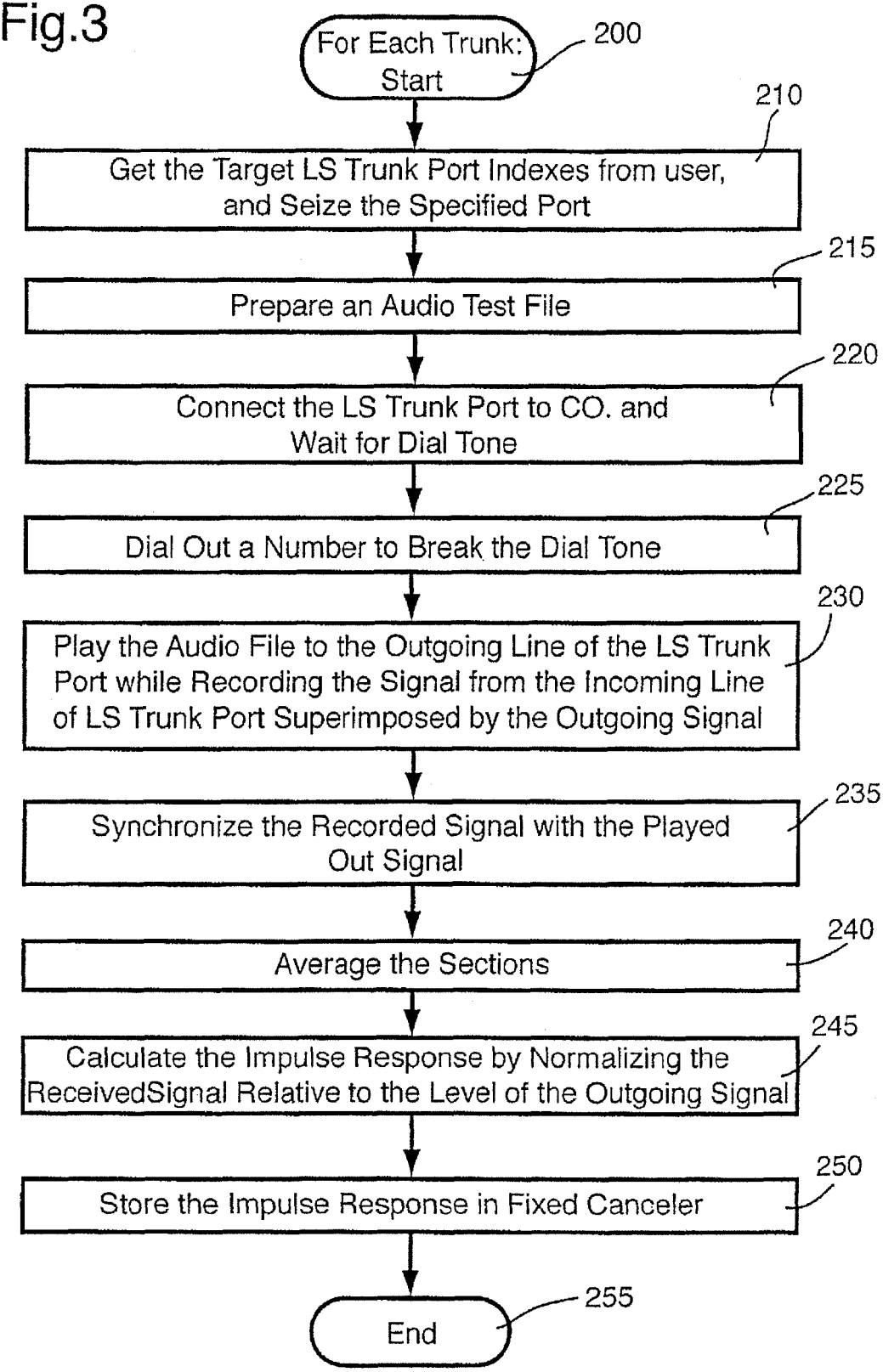
FIG. 3 is a flowchart of the method according to the embodiment of FIG. 2.

FIG. 3 depicts a method of capturing the echo path impulse response of the LS Trunk Line and using the captured impulse response as coefficients in the fixed echo canceller 160 according to the preferred embodiment of the present invention. Thus, for each trunk (step 200), the controller 150 retrieves the target LS trunk port indexes and seizes the specified port (step 210).

Next, an audio test file is prepared (step 215). For example, the audio file may contain a number (e.g. five) consecutive impulse signals spaced apart from one another (e.g. 200 ms apart). In the present embodiment, the audio test signals are generated by digital signal processor (DSP) 140.

The LS trunk port is then connected to the CO 110, and the controller 150 waits for dial tone (step 220).

Upon detection of dial tone, the controller 150 dials out a number (e.g. the CO silence termination number) to break the dial tone, and create silence on the line (step 225).

The DSP 140 then plays the audio file to the outgoing line 125 of the LS trunk interface (step 230), and at the same time controller 150 records the signal coming back from the incoming line 125 of the LS trunk interface, superimposed by the outgoing signal. The controller 150 then releases the LS trunk port.

The controller 150 then synchronizes the recorded signal with the played out signal by locating the impulses in the recorded signal (step 235). A predetermined number of audio samples are truncated after each impulse (e.g. in the preferred embodiment 128 samples are truncated, i.e. 16 ms).

Next, the consecutive sections of the recorded signal are averaged (e.g. averaging the five groups of samples to obtain a final audio sample). The outgoing signal is used for time synchronization purposes only. This averaging procedure (step 240) decreases the effect of random noise on the line as well as digital truncation error.

The controller 150 then calculates the impulse response by normalizing the received signal relative to the level of the outgoing signal (step 245).

Steps 210 to 245 result in obtaining the time-domain trans-hybrid transfer function.

Next, the impulse response is stored in the fixed echo canceller 160 for use as the coefficients therein (step 250), following which the process ends (step 255).

Figure 4:
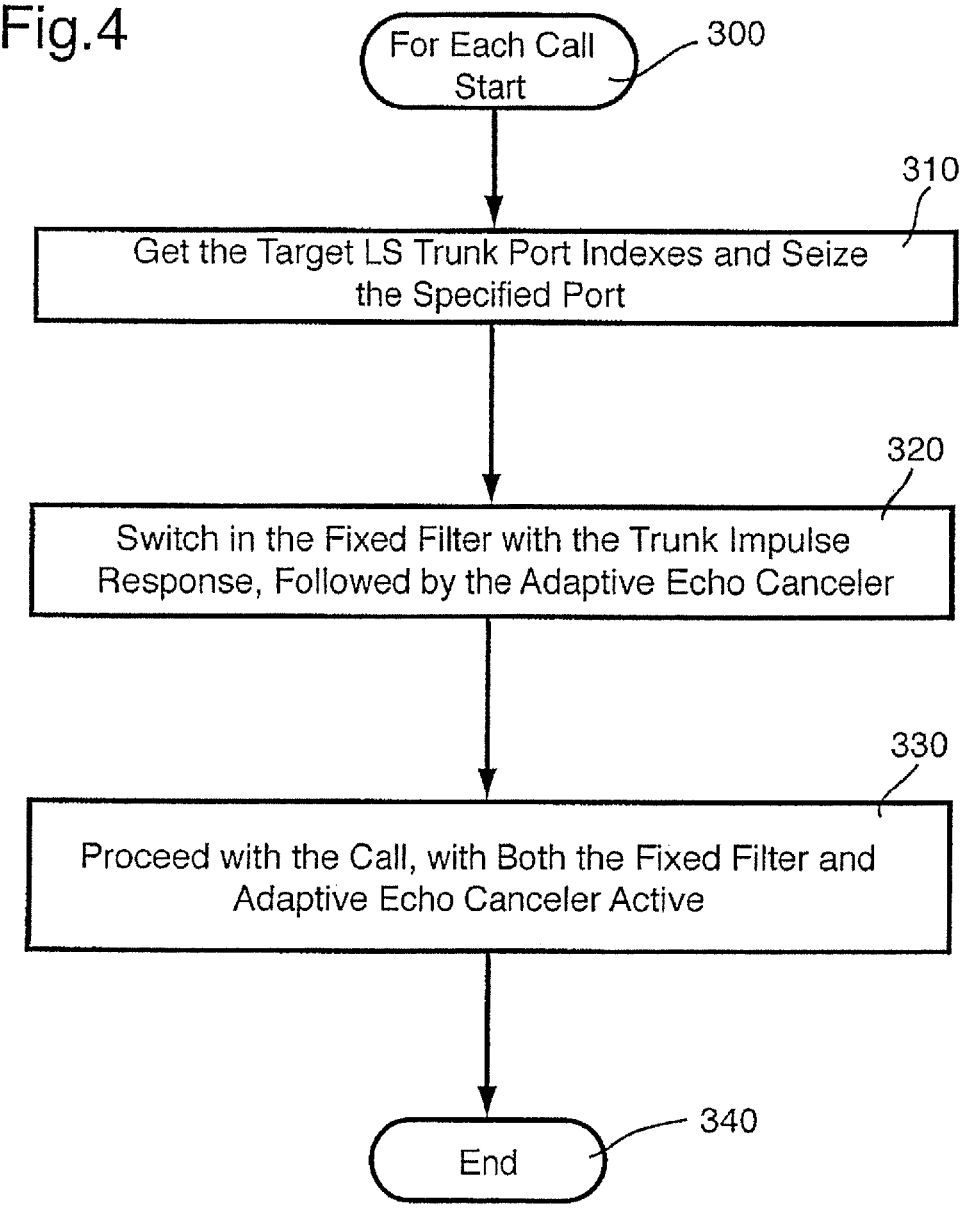
FIG. 4 is a flowchart showing a method of adaptive filter echo canceling during a call, according to one aspect of an embodiment of the present invention.

Reference is now made to the flow chart of FIG. 4 which shows a method of adaptive filter echo canceling during a call (beginning at step 300). The controller 150 retrieves the target LS trunk port indexes and seizes the specified port (step 310). Next, the fixed echo canceller 160 is switched in (on the line) using the trunk impulse response as filter coefficients, followed by the adaptive filter 170. The call then proceeds with both the fixed echo canceller 160 and the adaptive echo canceller 170 actively echo canceling (step 330), until the end of a call (step 340).

Figure 5:
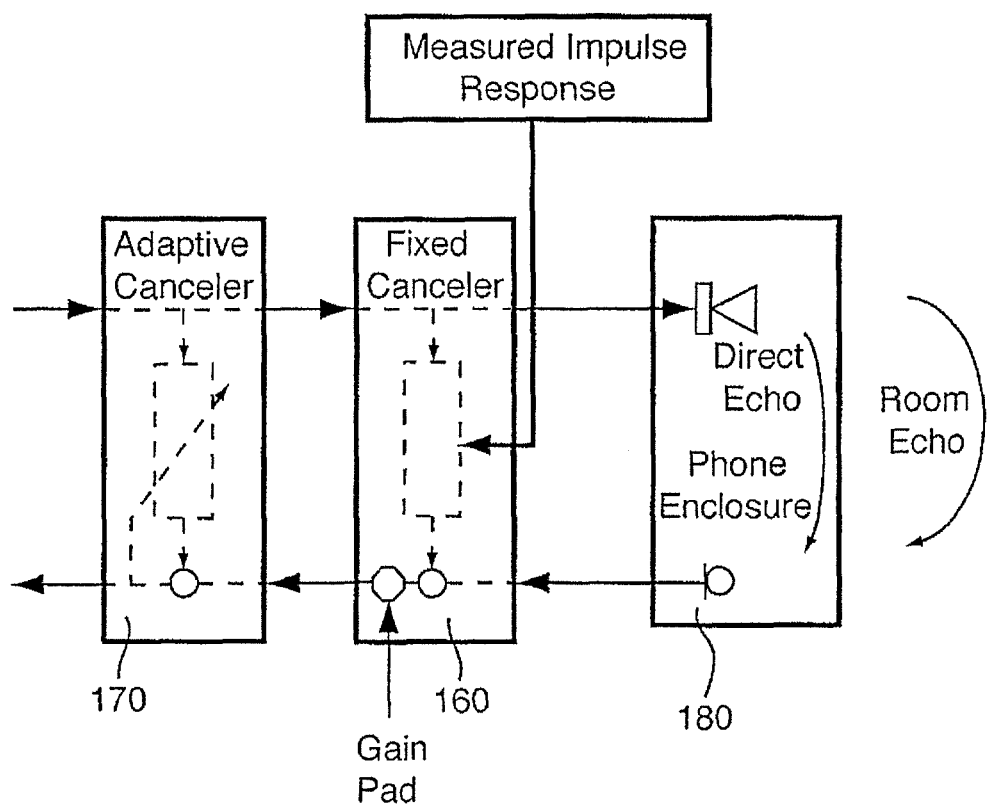
FIG. 5 is a control block diagram of an adaptive filter echo canceling system connected to an echo source in accordance with another embodiment of the present invention.

Although one application has been described and illustrated in detail, it will be understood that the present invention is not limited to the application described hereinabove. Referring to FIG. 5, there is shown another embodiment of the present invention in which an echo canceling system is connected to a phone enclosure 180. The phone enclosure 180 gives rise to a constant echo while the surrounding room gives rise to a time-varying echo. In the present embodiment, a fixed echo canceller 160 is connected intermediate the phone enclosure 180 and an adaptive filter 170, for canceling a constant portion of the echo using a measured impulse response as filter coefficients. The measurement of the impulse response is well within the scope of a person of ordinary skill in the art. From the fixed echo canceller 160, a constant echo conditioned signal is generated.

It will be appreciated that, although embodiments of the invention have been described and illustrated in detail, various modifications and changes may be made. Different approaches can be used for measuring the echo path response. For example, the measurement can be made with a white noise excitation signal. Further, the measurement can be made with the adaptive filter using actual speech during a call as the excitation signal. All such alternatives and modifications are believed to be within the scope of the invention as defined by the claims appended hereto.

What is claimed is:

1. An echo canceling system comprising:
    an adaptive filter connected to an echo source, for canceling echo from an echo path;
    a fixed echo canceller connected in series with said adaptive filter and intermediate said echo source and said adaptive filter, for canceling a constant portion of the echo using a measured impulse response of said echo path as filter coefficients and in response generating a constant echo conditioned signal, said fixed echo canceller including a gain pad for boosting said constant echo conditioned signal,
    wherein said echo source comprises a hybrid and said echo path comprises a trans-hybrid echo path and wherein said adaptive filter and said fixed echo canceller both actively echo canceling at the same time.

2. The echo canceling system of claim 1, wherein said fixed echo canceller is a Finite Impulse Response (FIR) filter.

3. The echo canceling system of claim 1, wherein said echo source includes a phone enclosure.

4. An echo canceling system for canceling echo from an echo path of an echo source, comprising:
- an adaptive echo canceller for canceling a time-varying portion of said echo; and
- a fixed echo canceller connected in series with said adaptive echo canceller and intermediate a hybrid and said adaptive filter, for canceling a constant portion of the echo using a measured impulse response of said echo path as filter coefficients and in response generating a constant echo conditioned signal, said fixed echo canceller including a gain pad for boosting said constant echo conditioned signal,
- wherein said echo source comprises a hybrid and said echo path comprises a trans-hybrid echo path and wherein both cancellers actively echo canceling at the same time.

5. The echo canceling system of claim 4, wherein said adaptive and fixed echo cancellers are Finite Impulse Response (FIR) filters.

6. The echo canceling system of claim 5, wherein said echo source includes a phone enclosure.

7. The echo canceling system of claim 4, wherein said echo source includes a phone enclosure.

8. The echo canceling system of claim 4, wherein said fixed echo canceller is a Finite Impulse Response (FIR) filter.

* * * * *